F. G. Johnson,
Rotary Meter,

N°. 40,485. Patented Nov. 3, 1863.

Witnesses:
Nicholas L. Pine
F. M. Havey

Inventor:
Frank G. Johnson

UNITED STATES PATENT OFFICE.

FRANK G. JOHNSON, OF BROOKLYN, NEW YORK.

IMPROVEMENT IN WATER-METERS.

Specification forming part of Letters Patent No. 40,485, dated November 3, 1863.

*To all whom it may concern:*

Be it known that I, FRANK G. JOHNSON, of the city of Brooklyn, in the county of Kings and State of New York, have invented a new and useful Improvement in the Construction of Water-Meters; and I do hereby declare that the following is a full, clear, and exact description of the construction and operation of the same, reference being had to the annexed drawings, making a part of this specification, in which—

Figure 1:
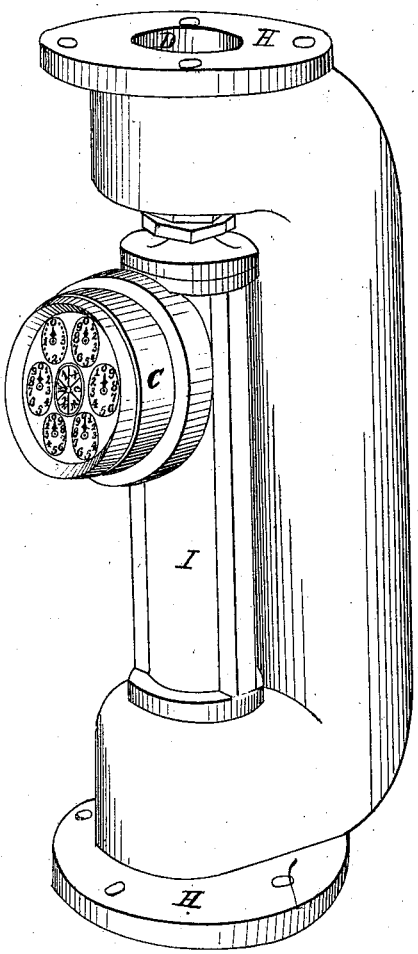
Figure 2:
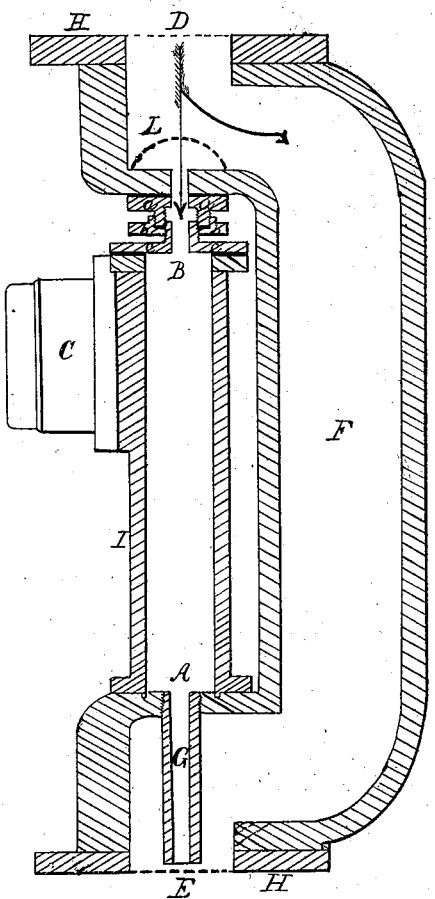

Figure 1 is a perspective view, and Fig. 2 a longitudinal section.

The nature of my invention consists in constructing an apparatus by means of which a small water-meter can be made to indicate the amount of water which passes through a large pipe, which I accomplish by dividing the water flowing through a given pipe into two streams—one a relatively large, and the other a small stream—in such a manner as to allow the small stream to pass through the meter and the large stream around the meter; the object of the invention being to cheapen the cost and increase the durability of water-meters, as well as to prevent coarse or foreign substances which may be contained in the water from interrupting the operations of the meter, by causing them to flow with the large stream around the meter, instead of through it.

The nature and operation of my invention are more minutely described as follows, reference being had to the drawings and the letters marked thereon.

C I, Fig. 1, is the meter (C being the registering-chamber) for which Letters Patent were granted to me by the United States, January 1, 1861. This C I is a complete water-meter in itself, when made sufficiently large to pass the stream of water to be measured; and as this meter C I is completely described in specification and drawings now on file at the Patent Office, and as the description of its interior is not essential to the description of my invention which I am here describing, it is omitted in these drawings and specification.

F, Fig. 2 is a pipe much larger than the openings at the top and bottom of the meter C I, which is turned at right angles at the top and bottom of the meter C I, to form shoulders and a recess to receive the same, as shown in the drawings.

c b a, taken together, are a jam and stuff nut for elongating, adjusting, and fastening the meter C I to the crooked pipe F.

G is a tube extending from the bottom of the meter C I down below the bend in F, to bring the outlet of the meter C I out of an eddy that might be formed higher up.

L is an arched screen over the opening into the meter C I, to keep out coarse dirt, which will cause it to be carried around C I through F.

H H are flanges for attaching the entire apparatus to the supply-pipe.

By drawing a given quantity of water through the apparatus, (that is, from the lower opening of F,) it is only necessary to graduate the registering apparatus in the meter C I to correspond to or indicate this given quantity, and the meter is then ready for use.

I know that water-meters have been constructed heretofore on the plan of ascertaining all the water that passes by measuring a part thereof, as in case of a patent granted to Samuel Krauser and Christian Ritter, November 13, 1855, in which they claim "the measuring or indicating the passage of a quantity of water through a pipe by allowing a small graduated portion thereof to escape and waste into a measuring and retaining receiver, or other vessel employed for that purpose." I do not therefore claim this principle of measuring the whole by measuring a part of the water, in a broad sense; but What I do claim, and desire to secure by Letters Patent of the United States, is—

The peculiar arrangement and combination of the crooked pipe F with the meter C I, substantially in the manner and for the purposes set forth.

FRANK G. JOHNSON.

Witnesses:
 WM. COLE,
 NICHOLAS L. PINE.